United States Patent [19]
Tamura

[11] Patent Number: 5,265,080
[45] Date of Patent: Nov. 23, 1993

[54] SERVO PHASE COMPENSATION SELECTION SYSTEM FOR AN OPTICAL DISC PLAYER

[75] Inventor: Takeo Tamura, Kanagawa, Japan
[73] Assignee: Sony Corporation, Tokyo, Japan
[21] Appl. No.: 897,368
[22] Filed: Jun. 11, 1992
[30] Foreign Application Priority Data
Jun. 17, 1991 [JP] Japan ................. 2-144839
[51] Int. Cl.⁵ .................................... G11B 7/00
[52] U.S. Cl. ....................... 369/44.35; 369/44.32; 369/44.15; 369/54
[58] Field of Search ............... 369/43, 44.11, 44.32, 369/44.35, 44.29, 54, 44.15, 247; 360/77.02

[56] References Cited
U.S. PATENT DOCUMENTS

| | | | |
|---|---|---|---|
| 4,623,994 | 11/1986 | Nabeshima et al. | 369/44.32 |
| 4,722,079 | 1/1988 | Matsumoto | 369/44.32 |
| 5,046,820 | 9/1991 | Saekusa et al. | 369/44.15 |
| 5,105,406 | 4/1992 | Imanaka | 369/44.32 |
| 5,117,410 | 5/1992 | Akiyama | 369/44.32 |

FOREIGN PATENT DOCUMENTS
0359368 3/1990 European Pat. Off.
60-057544 4/1985 Japan .
61-170933 8/1986 Japan .
63-129530 6/1988 Japan .
1-282747 11/1989 Japan .
2105336 4/1990 Japan .

Primary Examiner—Aristotelis Psitos
Assistant Examiner—P. W. Huber
Attorney, Agent, or Firm—Philip M. Shaw, Jr.; Charles P. Sammut

[57] ABSTRACT

A servo circuit for controlling an actuator provided on an optical pickup of a disc reproducing apparatus, the optical pickup optically reading out an information signal recorded on a disc is comprised of a phase compensating unit including a first phase compensator circuit whose gain characteristic and phase characteristic are set to first characteristics and a second phase compensator circuit whose gain characteristic and phase characteristic are set to second characteristics, the first and second phase compensator circuits being selectively coupled, a detecting circuit for detecting an oscillation of the actuator, and a switching circuit for switching the first and second phase compensator circuits from one to the other on the basis of an output from the detecting circuit.

5 Claims, 4 Drawing Sheets

SERVO PHASE COMPENSATION SELECTION SYSTEM FOR AN OPTICAL DISC PLAYER

BACKGROUND OF THE INVENTION

1. Field of the Invention

The present invention generally relates to servo circuits for controlling an optical pickup of a reproducing apparatus such as an optical disc reproducing apparatus or the like and, more particularly, to a servo circuit having a bi-axial actuator supported by a plurality of wires or the like which can carry out a tracking servo of an optical pickup having a high natural frequency (fo) and Q-value (Q).

2. Description of the Related Art

When a tracking servo is effected in the optical disc reproducing apparatus, for example, a tracking error signal is supplied to a phase compensator circuit to increase the level of low band of the error signal. Then, the error signal thus phase-compensated is supplied to a drive amplifier and a drive signal from this drive amplifier is supplied to a tracking coil of an optical pickup. However, in the apparatus using such phase compensator circuit, as the gain of the low band of the error signal is increased, a phase delay tends to occur in the low band component. In particular, when the tracking servo is effected on an actuator in which a drive magnet, an objective lens or the like are unitarily supported by wire members, the natural frequency fo and the Q value thereof become higher than those of an actuator supported by means of a mold hinge. There is then the risk that the actuator is oscillated.

OBJECTS AND SUMMARY OF THE INVENTION

Therefore, it is an object of the present invention to provide a servo circuit in which the aforesaid shortcomings and disadvantages encountered with the prior art can be eliminated.

More specifically, it is an object of the present invention to provide a novel servo circuit for effecting a tracking servo on an optical pickup of a disc reproducing apparatus.

Another object of the present invention is to provide a servo circuit in which an oscillation caused by disturbances such as a defect of a disc, an external vibration or the like due to a phase delay of a tracking servo characteristic can be avoided to effect a stable tracking servo when the tracking servo is effected on an optical pickup having a resonance frequency (natural vibration) fo and a high Q value.

According to an aspect of the present invention, there is provided a servo circuit which is comprised of a phase compensating unit including a first phase compensator circuit whose gain characteristic and phase characteristic are set to first characteristics and a second phase compensator circuit whose gain characteristic and phase characteristic are set to second characteristics, the first and second phase compensator circuits being selectively coupled, a detecting circuit for detecting an oscillation of the actuator, and a switching circuit for switching the first and second phase compensator circuits from one to the other on the basis of an output from the detecting circuit. The second phase compensator circuit has a phase characteristic such that a phase is advanced from low to high bands constantly.

When an oscillation of the actuator in the tracking direction of the disc is detected by the detecting circuit, the first phase compensator circuit is switched to the second phase compensator circuit so as to drive the second phase compensator circuit, thereby preventing the actuator from being oscillated due to the phase delay.

BRIEF DESCRIPTION OF THE DRAWINGS

A better understanding of other objects, features, and advantages of the present invention will be gained from a consideration of the following detailed description of an illustrative embodiment thereof, in conjunction with the figures of the accompanying drawings, in which.

DETAILED DESCRIPTION OF THE PREFERRED EMBODIMENT

Before describing the servo circuit according to the present invention, let us first describe an example of an optical pickup on which the tracking control is effected by the servo circuit of the present invention.

Figure 1:
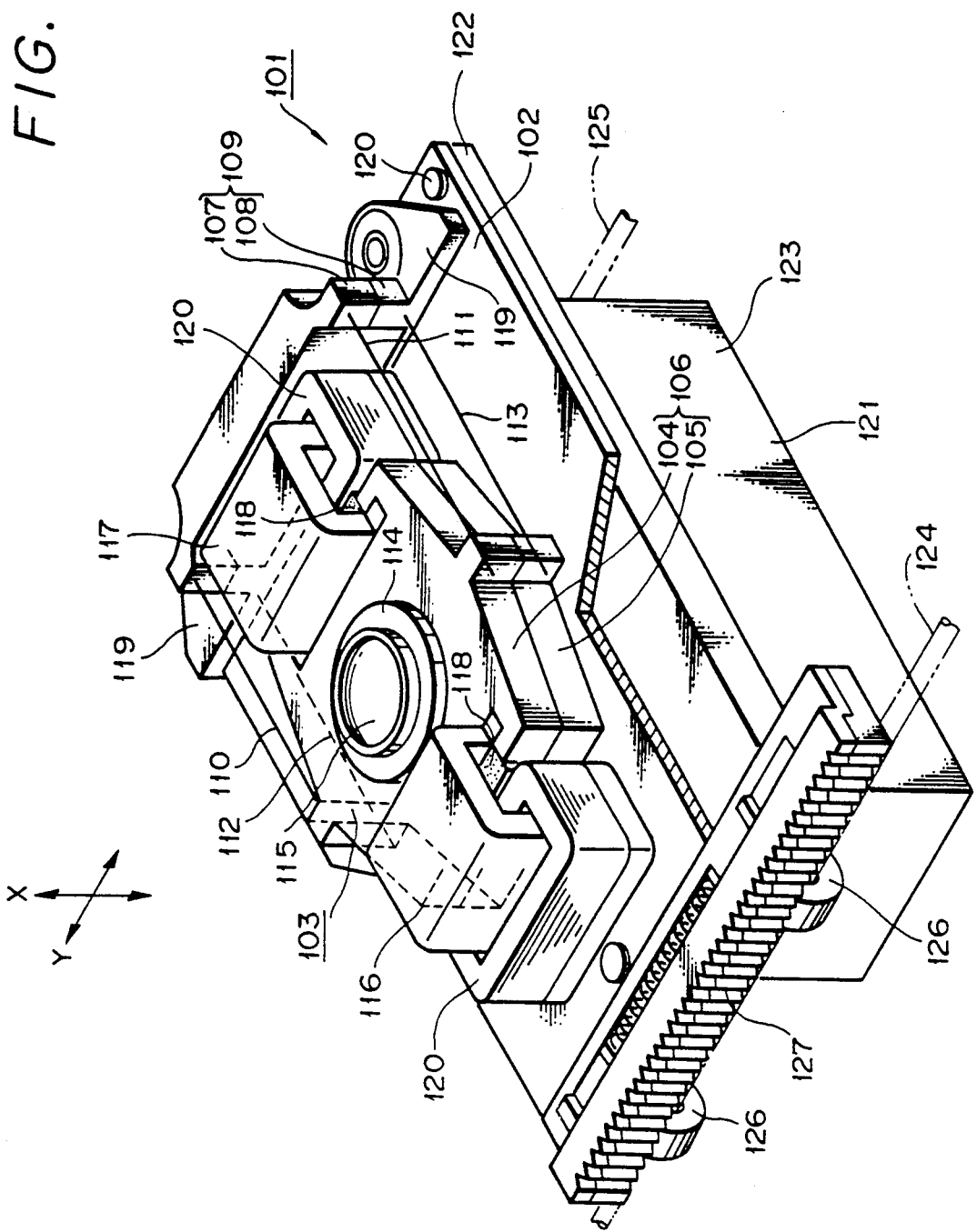
FIG. 1 is a perspective view illustrating an external appearance of an optical pickup to which a servo circuit of the present invention is applied.

FIG. 1 of the accompanying drawings shows a perspective view of an external appearance of an optical pickup to which the servo circuit of the present invention is applied. An optical pickup generally depicted by reference numeral 101 includes an actuator 103 mounted on a supporting base 102.

Referring to FIG. 1, the actuator 103 comprises a bobbin portion 106 formed of a pair of upper and lower bobbin parts 104 and 105 in abutment, a holder portion 109 formed of a pair of upper and lower holder parts 107 and 108 in abutment and which is served as a mount supporting portion for the support base 102, first and second wire members 110 and 111 stretched for coupling the upper bobbin part 104 and the upper holder part 107, and third and fourth parallel wire members 112 and 113 disposed in parallel to the first and second wire members 110 and 111 disposed so as to couple the lower bobbin part 105 and the lower holder part 108. Each of the wire members 110, 111, 112 and 113 is formed by punching out a metal plate such as a thin stainless steel plate or the like and is square in cross section whose one side is about 0.1 to 0.2 mm. When the upper bobbin part 104, the upper holder part 107 and the lower bobbin part 105, the lower holder part 108 are molded, these wire members 110, 111, 112 and 113 are molded in an insert molding process or in an outsert molding process within a metal mold, thereby the ends thereof being unitarily supported to the upper bobbin part 104, the upper holder part 107 and the lower bobbin part 105, the lower holder part 108, respectively.

An objective lens 115 held on a lens holding barrel 114 made of a synthetic resin is attached to the upper bobbin part 104 side. Yokes 116, 117 and magnets 118, 118 for displacing the objective lens 115 in the optical axis direction, i.e., the focusing direction (in the direction shown by an arrow X in FIG. 1) and in the direction perpendicular to the optical axis direction, i.e., tracking direction (in the direction shown by an arrow Y in FIG. 1) are respectively attached to opposing side surfaces of the bobbin portion 106 composed of the upper bobbin part 104 and the lower bobbin part 105, respectively.

The actuator 103 thus constructed has supporting projections 119 projected from both side ends of the lower holder part 108, and the supporting projections 119 are supported on the supporting base 102 at its predetermined position by fixed pins 120. In this way, the actuator 103 is attached onto the supporting base 102 while the height thereof relative to the supporting base 102 is being restricted.

Under the condition that the actuator 103 is attached to the supporting base 102, focusing coils 120, 120 and tracking coils are attached on the supporting base 102 in an opposing relation to the yokes 116, 117 and the magnets 118, 118, respectively. The tracking coils are not shown in FIG. 1 but they are respectively attached to one side surfaces of the focusing coils 120, 120 so as to oppose the magnets 118, 118. When these focusing coils 120, 120 and tracking coils are supplied with a control signal, the objective lens 15 is moved in the focusing direction and the tracking direction.

Incidentally, the actuator 103 is attached on an optical system block 121 by means of the supporting base 102 serving as a mount to thereby construct the optical pickup 101. An information signal recorded on an optical disc (not shown) is reproduced by the optical pickup 101. The optical system block 121 comprises a movable base member 122 and a laser light generating/detecting unit 123 which is unitarily attached to the lower surface side of the movable base member 122. A laser light radiated on the surface of the optical disc through the objective lens 115 is generated by the laser light generating/detecting unit 123, and a reflected light from the optical disc is detected by the laser light generating/detecting unit 123 and then output as an information signal.

Further, the optical pickup 101 is guided by guide members 124, 125 disposed within an optical disc reproducing apparatus (not shown) and moved in the radial direction (the arrow Y direction in FIG. 1) of the optical disc, thereby reproducing the information signal from the optical disc. To this end, the movable base member 122 is provided with slide bearing portions 126, 126, which are loosely fitted into the cylindrical guide member 124, and a rack portion 127. The movable base portion 122 is moved in the radial direction of the optical disc by a driving force of a rack-pinion drive mechanism (not shown) disposed within the optical disc reproducing apparatus.

Let us now describe the case such that the servo circuit according to the present invention is applied to the tracking servo operation of the optical pickup thus constructed.

Figure 2:
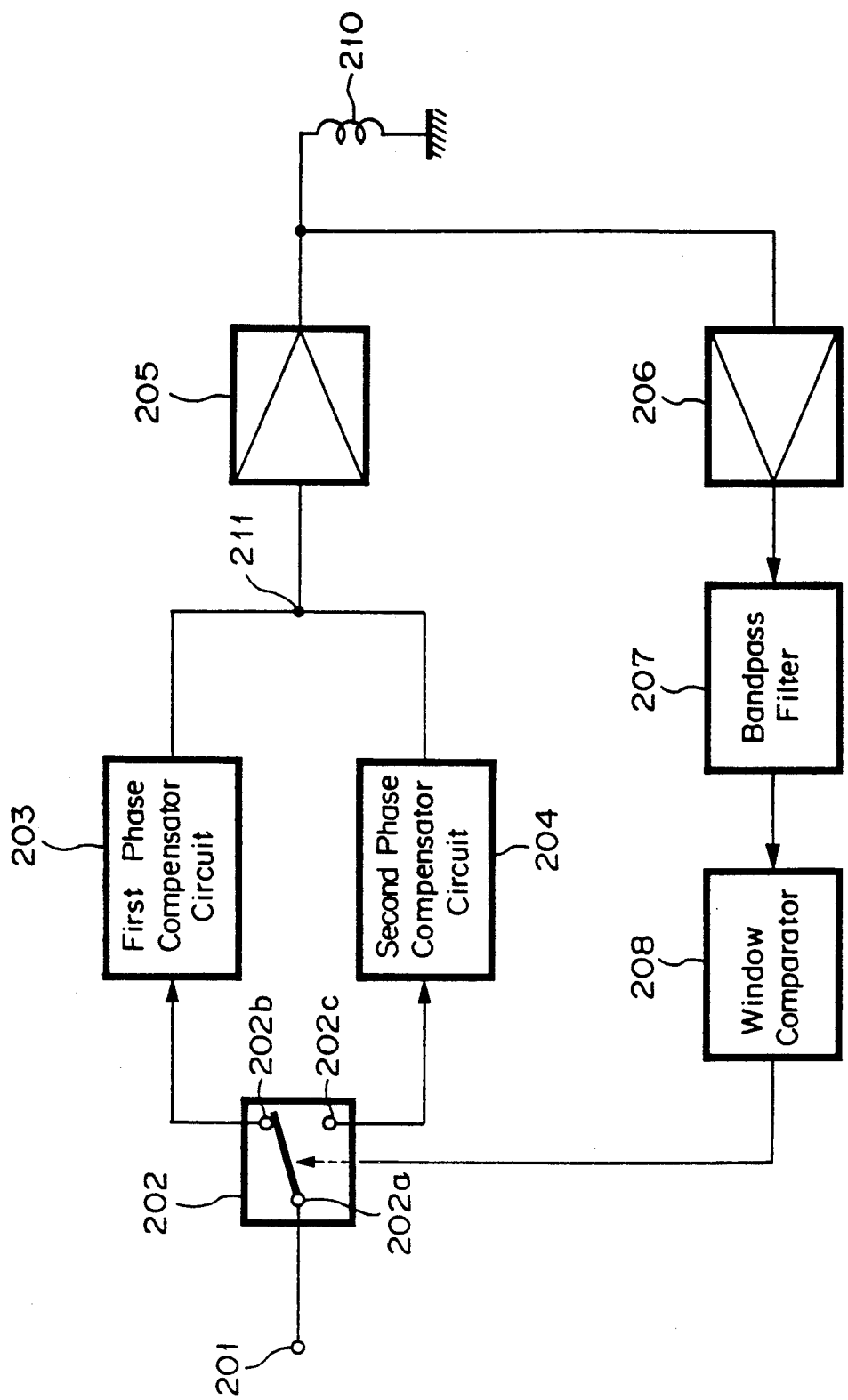
FIG. 2 is a block diagram showing the servo circuit according to an embodiment of the present invention.

FIG. 2 of the accompanying drawings shows a block diagram of the servo circuit according to an embodiment of the present invention and which is disposed within the laser light generating/detecting unit 123 for effecting the tracking control on the objective lens 115.

Referring to FIG. 2, a tracking error signal is supplied to a terminal 201 and this terminal 201 is coupled to a movable contact 202a of a switch 202. A first phase compensator circuit 203 has a gain adjusted to be a first predetermined level and a first fixed contact 202b of the switch 202 is connected to the input terminal of the first phase compensator circuit 203. A second phase compensator circuit 204 has a gain adjusted to be a level which is higher than the first level and a second fixed contact 202c of the switch 202 is connected to the input terminal of the second phase compensator circuit 204. Outputs of the first and second phase compensator circuits 203 and 204 are coupled to each other as a junction 211 which is coupled through a drive amplifier 205 to a tracking coil 210 of the optical pickup 101 (not shown in FIG. 2).

The output of the drive amplifier 205 is connected to a buffer amplifier 206 and an output of the buffer amplifier 206 is coupled to a bandpass filter 207 which detects the natural frequency fo. An output of the bandpass filter 207 is coupled to a window comparator 208 and an output of the window comparator 208 is coupled to a control terminal of the switch 202.

Operation of the servo circuit thus arranged will be described with reference to FIGS. 3 through 6.

In the optical disc reproducing apparatus, when an optical disc is reproduced normally, the movable contact 202a the switch 202 in the servo circuit shown in FIG. 2 is connected to the first fixed contact 202b and hence the first phase compensator circuit 203 is driven. At that time, the gain characteristic of the tracking servo is shown by a solid line a in FIG. 3 in which the gain in the low frequency is high as compared with that of the middle frequency, while the phase characteristic of the tracking servo is shown by a solid line b. Thus, the phase delay occurred in the low frequency.

Figure 4:
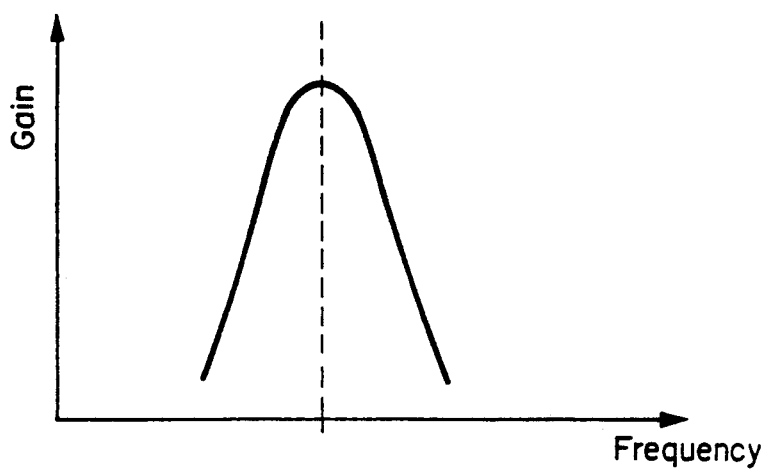
FIG. 4 is a characteristic graph graphing characteristics of a bandpass filter used in the servo circuit according to the present invention.
Figure 5:
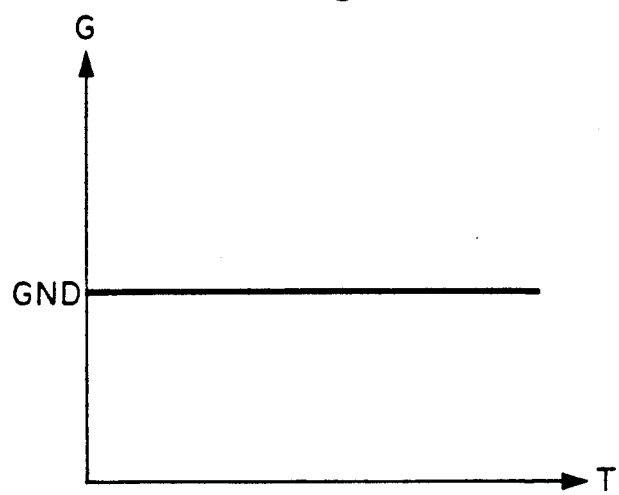
FIG. 5 is a diagram showing a waveform of an output of the bandpass filter when an actuator is not oscillated.
Figure 6:
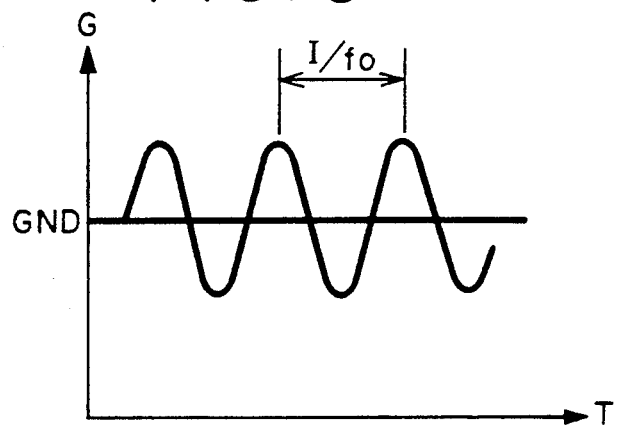
FIG. 6 is a diagram showing a waveform of an output of the bandpass filter when the actuator is oscillated.

Further, the bandpass filter 207 has a characteristic shown in FIG. 4 such that the peak level is presented at the natural frequency fo. As a result, substantially a ground potential GND is obtained in the output of the bandpass filter 207 in the stationary state as shown in FIG. 5. However, when the objective lens holder portion 106 of the optical pickup shown in FIG. 1 is vibrated at a frequency near the natural frequency fo in the tracking direction (Y direction in FIG. 1) due to influences such as an external disturbance or the like, a signal shown in FIG. 6 is produced in the output of the bandpass filter 207. This signal is input to the window comparator 208 which then detects that the level of this signal becomes higher than the predetermined level. Then, the movable contact 202a the switch 202 is connected to the second fixed contact 202c by a detected signal from the window comparator 208.

When a vibration is applied to the optical pickup from the outside as described above or the track access is being effected, the movable contact 202a of the switch 202 is connected to the second fixed contact 202c to thereby drive the second phase compensator circuit 204. The gain characteristic of the tracking servo at that time is shown by a broken line c in FIG. 3, in which the gain in the low frequency band is not changed from that in the normal reproducing mode and the gain in the high frequency band is set to be high as shown by a broken line d in FIG. 3. Therefore, the phase delay in the low band, which causes the oscillation, can be avoided.

That is, in the above-mentioned servo circuit, when the optical pickup 101 is oscillated at the natural frequency fo, such oscillation is detected by the bandpass filter 207 and the window comparator 208 and the movable contact 202a of the switch 202 is connected to the second fixed contact 202c to thereby drive the second phase compensator circuit 204. In this case, the phase characteristic of the second phase compensator circuit 204 can be prevented from producing a phase delay in the low frequency band, thereby preventing the optical pickup from being oscillated.

Figure 3:
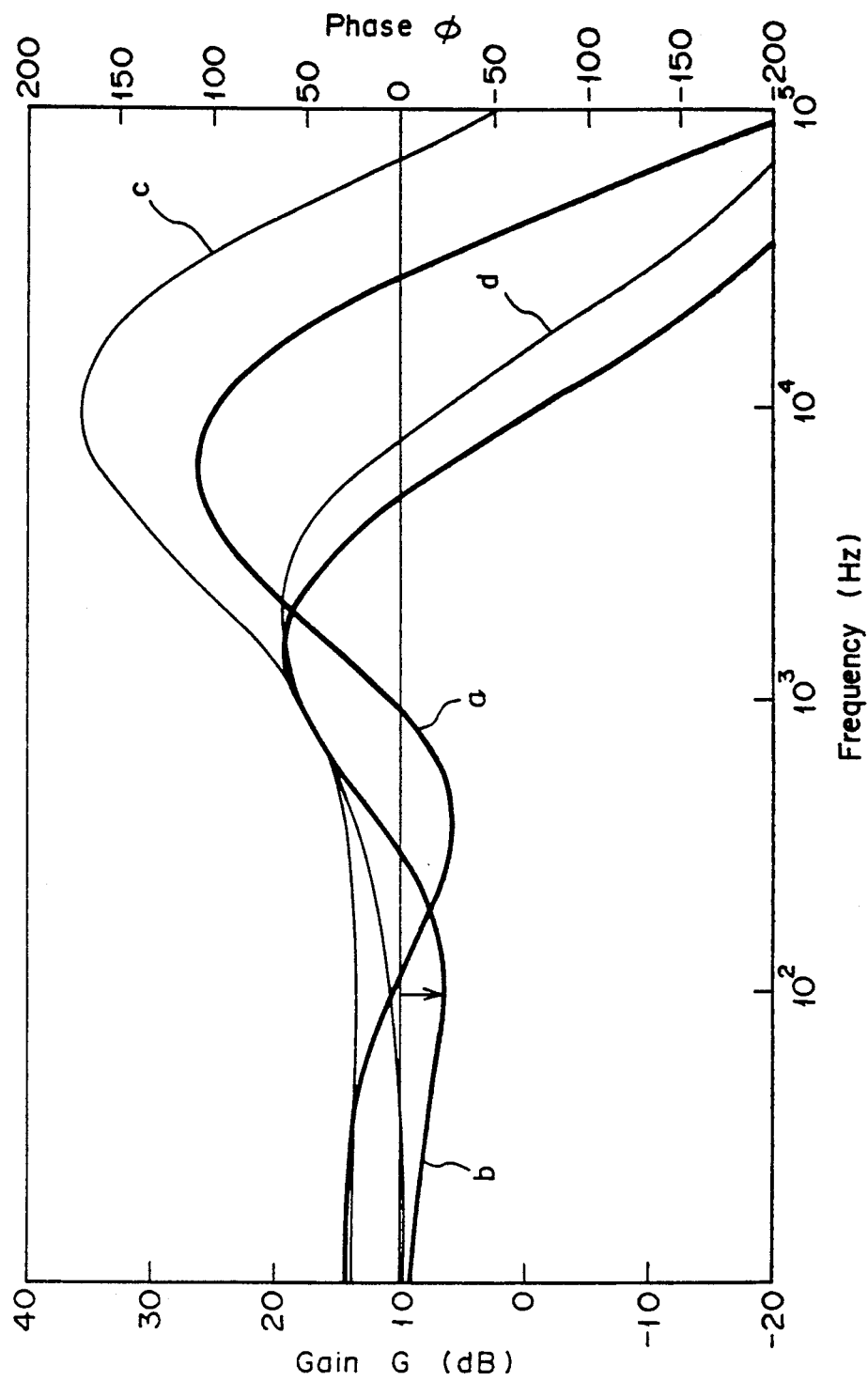
FIG. 3 is a diagram showing gain characteristics and phase characteristics of a phase compensator circuit which comprises the servo circuit according to the present invention.

When the second phase compensator circuit 204 is constantly used, the gain characteristic shown by the broken line c in FIG. 3 is increased in the high frequency band, resulting in the servo characteristic relative to smudges on the disc or the like being deteriorated. For this reason, in the above-mentioned servo circuit, the oscillation of the optical pickup at the natural frequency fo is detected and then the characteristic of the phase compensator circuit is switched.

As described above, according to the servo circuit of the present invention, when the start of oscillation of the optical pickup 101 is detected, then the first phase compensator circuit 203 is switched to the second phase compensator circuit 204 whose gain is set to be higher in level than that of the first phase compensator circuit 203. Then, this second phase compensator circuit 204 is driven to prevent the actuator from being oscillated.

Therefore, as described above, the bi-axial actuator having high natural frequency fo and high Q value and which is supported by means of wires, etc., can be prevented from being oscillated due to vibration caused by the influence of external disturbance.

Furthermore, since the actuator can be prevented from being oscillated even when applied with the vibration in the access of the disc, the access at higher speed can be realized.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A servo system for controlling an actuator provided on an optical pickup of a disc reproducing apparatus, said optical pickup optically reading out information signals recorded on a disc comprising:

(a) phase compensating means including a first phase compensator circuit whose gain characteristic and phase characteristic are set to first characteristics and a second phase compensator circuit whose gain characteristic and phase characteristic are set to second characteristics;

(b) detecting means for sensing an oscillation of said actuator including a band-pass filter whose pass band is a predetermined frequency band including a natural oscillation frequency $f_o$ of said actuator, and a comparator for detecting oscillations of said actuator by detecting whether or not an output of said band-pass filter becomes higher than a predetermined level; and (c) switching means for coupling a tracking error signal to said actuator through said first phase compensator circuit when the output of said band-pass filter is no greater than said predetermined level and coupling said tracking error signal to said actuator through said second phase compensator circuit when the output of said band-pass filter is greater than said predetermined level.

2. The servo system according to claim 1, in which said second phase compensator circuit has a phase characteristic such that a phase is advanced over low to high frequency bands constantly.

3. The servo system according to claim 2, in which the gain characteristic of said second phase compensator circuit is set so as to become higher level than that of said first phase compensator circuit and switching means is provided to switch from said first phase compensator circuit to said second phase compensator circuit such that said second phase compensator circuit is driven when an oscillation of said actuator is detected by said detecting means.

4. The servo system according to claim 1, in which said actuator is composed of an objective lens for converging a laser light on a recording track formed on said disc, a holder for holding said objective lens, and a plurality of wire members disposed parallel to each other for supporting said holder such that said objective lens is moved in the focusing direction and in the tracking direction.

5. The servo system according to claim 1, wherein said tracking error signal is detected from light reflected on said disc and said detecting means detects the oscillation of said actuator in the tracking direction.

* * * * *